(12) United States Patent
Teigne et al.

(10) Patent No.: US 12,491,982 B2
(45) Date of Patent: Dec. 9, 2025

(54) ACOUSTIC PANEL FOR AN AIRCRAFT PROVIDING NOISE ATTENUATION OVER A WIDE FREQUENCY BAND BY COMBINING TWO RESONATORS, AND ACOUSTIC PANEL MANUFACTURING METHOD

(71) Applicant: Airbus Operations SAS, Toulouse (FR)

(72) Inventors: Manuel Teigne, Toulouse (FR); Maxime Gauthier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 275 days.

(21) Appl. No.: 18/311,337

(22) Filed: May 3, 2023

(65) Prior Publication Data

US 2023/0365246 A1 Nov. 16, 2023

(30) Foreign Application Priority Data

May 16, 2022 (FR) ........................................ 2204604

(51) Int. Cl.
*B64C 1/40* (2006.01)
*B32B 3/12* (2006.01)
*B32B 7/12* (2006.01)
*B32B 37/02* (2006.01)
*B32B 37/12* (2006.01)
(Continued)

(52) U.S. Cl.
CPC ................. *B64C 1/40* (2013.01); *B32B 3/12* (2013.01); *B32B 7/12* (2013.01); *B32B 37/02* (2013.01); *B32B 37/12* (2013.01); *B64D 33/06* (2013.01); *B32B 2305/024* (2013.01);
(Continued)

(58) Field of Classification Search
CPC .... B64C 1/40; B32B 3/12; B32B 7/12; B32B 37/02; B32B 37/12; B32B 2305/024; B32B 2307/102; B32B 2605/18; B64D 33/069; G10K 11/168; G10K 11/172
See application file for complete search history.

(56) References Cited

U.S. PATENT DOCUMENTS 5,338,594 A * 8/1994 Wang ........................ B32B 3/12
  428/458
5,445,861 A * 8/1995 Newton ............... G10K 11/172
  428/116
(Continued)

FOREIGN PATENT DOCUMENTS

| FR | 3100917 A1 | 3/2021 |
| FR | 3111002 A1 | 12/2021 |
| WO | 2009115700 A1 | 9/2009 |

OTHER PUBLICATIONS

French Search Report for French Patent Application No. 2204604 dated Dec. 12, 2022; priority document.

*Primary Examiner* — Forrest M Phillips
(74) *Attorney, Agent, or Firm* — Greer, Burns & Crain, Ltd.

(57) ABSTRACT

An acoustic panel for an aircraft providing noise attenuation over a wide frequency band by combining two resonators, and acoustic panel manufacturing method. The acoustic panel includes a rear skin, a cellular structure, an intermediate layer including perforations, a cellular structure, a cellular structure and a resistive skin including perforations. The acoustic panel combines quarter-wave resonators with Helmholtz resonators to provide noise attenuation over a wide frequency range.

15 Claims, 6 Drawing Sheets

(51) Int. Cl.
  *B64D 33/04* (2006.01)
  *G10K 11/168* (2006.01)
  *G10K 11/172* (2006.01)

(52) U.S. Cl.
  CPC ..... *B32B 2307/102* (2013.01); *B32B 2605/18* (2013.01); *G10K 11/168* (2013.01); *G10K 11/172* (2013.01)

(56) References Cited

U.S. PATENT DOCUMENTS

| | | | | |
|---|---|---|---|---|
| 5,667,866 | A | * | 9/1997 | Reese, Jr. ................. B32B 5/26 428/116 |
| 8,070,994 | B2 | * | 12/2011 | Carlson ................. B29C 44/186 264/46.7 |
| 2019/0071164 | A1 | * | 3/2019 | Penn ....................... B32B 15/20 |
| 2021/0371118 | A1 | | 12/2021 | Porte et al. |

\* cited by examiner

ACOUSTIC PANEL FOR AN AIRCRAFT PROVIDING NOISE ATTENUATION OVER A WIDE FREQUENCY BAND BY COMBINING TWO RESONATORS, AND ACOUSTIC PANEL MANUFACTURING METHOD

CROSS-REFERENCES TO RELATED APPLICATIONS

This application claims the benefit of the French patent application No. 2204604 filed on May 16, 2022, the entire disclosures of which are incorporated herein by way of reference.

FIELD OF THE INVENTION

The present invention relates to an acoustic panel for an aircraft providing noise attenuation over a wide frequency band, and a manufacturing method for the acoustic panel.

BACKGROUND OF THE INVENTION

It is known that, on an aircraft, for example on a cargo plane, a significant amount of noise is often generated, in particular by the propulsion units of the aircraft. In order to reduce the sound effect produced by the propulsion units, it is known to provide walls fitted with panels providing good acoustic absorption, in particular on the nacelles of the propulsion units. Usually, an acoustic attenuation panel generally comprises a plate made of a material and/or a structure having good acoustic absorption properties, notably for the most annoying noise frequencies.

This plate often has a honeycomb cellular structure, and is provided with a resistive skin, which is often perforated, on one side, and an unperforated rear skin on the other side. The size of the cells (section and height) of the honeycomb structure is globally adapted to the frequency of the noise to be absorbed.

To achieve noise absorption over a wide frequency band, there are acoustic panels that combine two types of resonators: the quarter-wave resonator and the Helmholtz resonator.

Acoustic panels combining these two resonators usually comprise two cellular structures separated by a partition made of a glass-fiber composite material. Such panels also include a plurality of tubes that are inserted into all of the cells of one of the cellular structures. However, inserting tubes into all of the cells is a difficult operation to carry out.

Document FR 3111002 also describes an acoustic panel that is able to handle different frequency ranges. Said acoustic panel comprises a cellular structure in which diaphragms are inserted into some of the cells. Different frequency ranges can be handled by adjusting the arrangement of the diaphragms in the cells. However, incorporating the diaphragms and determining the position thereof in the cells can be difficult.

SUMMARY OF THE INVENTION

The present invention is intended to overcome these drawbacks. To do so, the invention relates to an acoustic panel for an aircraft.

According to the invention, the acoustic panel comprises the following superposed elements arranged in a given order and fastened together:
- a solid rear skin,
- a first cellular structure comprising a network of cells, each of the cells having a first characteristic section and a first longitudinal axis,
- an intermediate layer comprising first perforations, each of the first perforations being aligned with a cell of the first cellular structure, the first perforations of the intermediate layer having a characteristic surface area that is strictly smaller than the first characteristic section,
- a second cellular structure comprising a network of cells, each of the cells having a second characteristic section and a second longitudinal axis parallel to the first longitudinal axis, the second characteristic section being strictly smaller than the first characteristic section,
- a third cellular structure comprising a network of cells, each of the cells having a third characteristic section and a third longitudinal axis parallel to the second longitudinal axis,
- a resistive skin comprising second perforations.

The acoustic panel therefore combines two sets of resonators: a set of quarter-wave resonators provided by the third cellular structure and a set of Helmholtz resonators provided by the first and second cellular structures. The acoustic panel is easier to manufacture since it is no longer necessary to insert a plurality of tubes in all of the cells of one of the cellular structures, nor to arrange diaphragms in the cells of a cellular structure.

Furthermore, each of the first perforations of the intermediate layer is aligned with at least one cell of the second cellular structure.

According to one embodiment, the intermediate layer is a perforated plate fastened to the first cellular structure and to the second cellular structure.

According to another embodiment, the intermediate layer is a perforated adhesive layer.

The invention also relates to a method for manufacturing an acoustic panel of an aircraft as specified above.

According to the invention, the manufacturing method comprises the following steps:
- a first forming and fastening step that comprises forming the rear skin and the first cellular structure in a mold and fastening the rear skin to a first face of the first cellular structure,
- an assembly step that comprises assembling the intermediate layer on a second face of the first cellular structure and on a first face of the second cellular structure, the second face of the first cellular structure being opposite the first face of the first cellular structure,
- a second forming and fastening step that comprises forming the resistive skin and the third cellular structure in the mold and fastening the resistive skin to a first face of the third cellular structure,
- a third fastening step that comprises fastening a second face of the second cellular structure to a second face of the third cellular structure, the second face of the second cellular structure being opposite the first face of the second cellular structure, the second face of the third cellular structure being opposite the first face of the third cellular structure.

In a first embodiment, the assembly step comprises the following sub-steps:
- a first identification sub-step that comprises using an identification device to determine the positions of the centers of the cells of the first cellular structure,
- a first forming and fastening sub-step that comprises forming a solid layer and the second cellular structure in the mold and fastening the solid layer to the first face of the second cellular structure, a sub-step of fastening the solid layer to the second face of the first cellular structure to which the rear skin is fastened during the forming and fastening step, a second identification sub-step that comprises using the identification device to determine the positions of the centers of the cells of the second cellular structure, a sub-step of applying an adhesive layer to the second face of the second cellular structure, the adhesive layer being perforated at each of the cells of the second cellular structure, a perforation sub-step in which a perforation device is used to perforate the solid layer to obtain the intermediate layer, the perforation sub-step comprising a plurality of first perforations of the solid layer at positions corresponding to positions determined during the second identification sub-step closest to the positions determined during the first identification sub-step, in which the third fastening step comprises fastening the second face of the second cellular structure to the second face of the third cellular structure using the adhesive layer applied during the application sub-step.

In a second embodiment, the assembly step comprises the following sub-steps:

a first forming and fastening sub-step that comprises forming a solid layer and the second cellular structure in the mold and fastening the solid layer to the first face of the second cellular structure, a sub-step of fastening the solid layer to the second face of the first cellular structure to which the rear skin is fastened during the forming and fastening step, a sub-step of applying an adhesive layer to the second face of the second cellular structure, the adhesive layer being perforated at each of the cells of the second cellular structure, a perforation sub-step in which a perforation device is used to perforate the solid layer to obtain the intermediate layer, the perforation sub-step comprising a plurality of first perforations of the solid layer at positions corresponding to a predetermined regularly repeating positional pattern, the positional pattern being predetermined as a function of the network of cells of the first cellular structure, in which the third fastening step comprises fastening the second face of the second cellular structure to the second face of the third cellular structure using the adhesive layer applied during the application sub-step.

In a third embodiment, the assembly step comprises the following sub-steps:

a first forming sub-step that comprises forming the second cellular structure in the mold, a first application sub-step that comprises applying an adhesive layer to form the intermediate layer, the first application sub-step comprising the application of the adhesive layer to the first face of the second cellular structure, the adhesive layer being perforated at positions corresponding to a predetermined repeating positional pattern, the positional pattern being predetermined as a function of the network of cells of the first cellular structure, a sub-step of fastening the second cellular structure to the first cellular structure using the adhesive layer applied during the first application sub-step.

According to the third embodiment, the manufacturing method further comprises a step of applying an adhesive layer to the second face of the third cellular structure, the adhesive layer being perforated at each cell of the second cellular structure, the application step preceding the third fastening step, the third fastening step comprising the fastening of the second face of the second cellular structure to the second face of the third cellular structure using the adhesive layer applied during the application step.

The invention also relates to an aircraft propulsion unit comprising at least one acoustic panel as described above.

The invention also relates to an aircraft comprising at least one acoustic panel as described above.

BRIEF DESCRIPTION OF THE DRAWINGS

The attached figures help to understand how the invention can be carried out. In these figures, identical reference signs refer to similar elements.

DETAILED DESCRIPTION OF THE PREFERRED EMBODIMENTS

Figure 1:
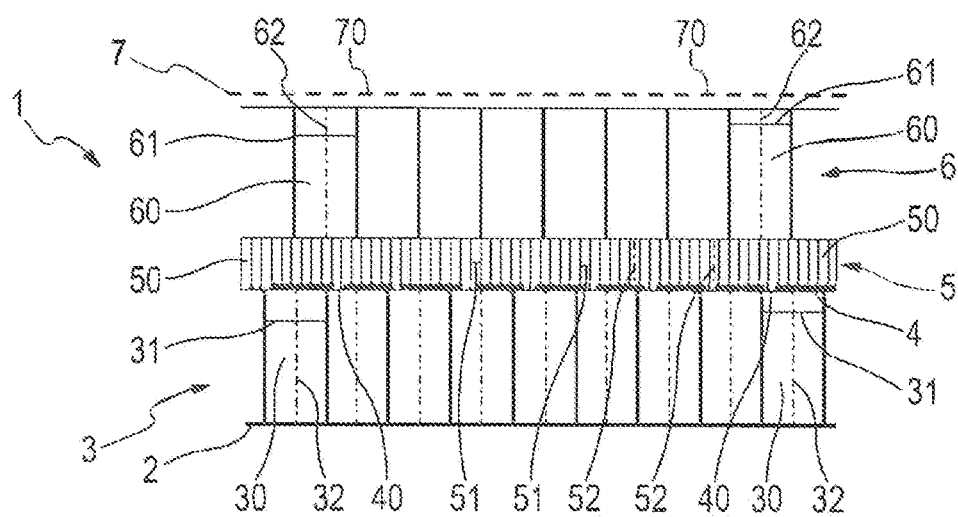
FIG. 1 shows a cross section of the acoustic panel according to the present invention.
Figure 2:
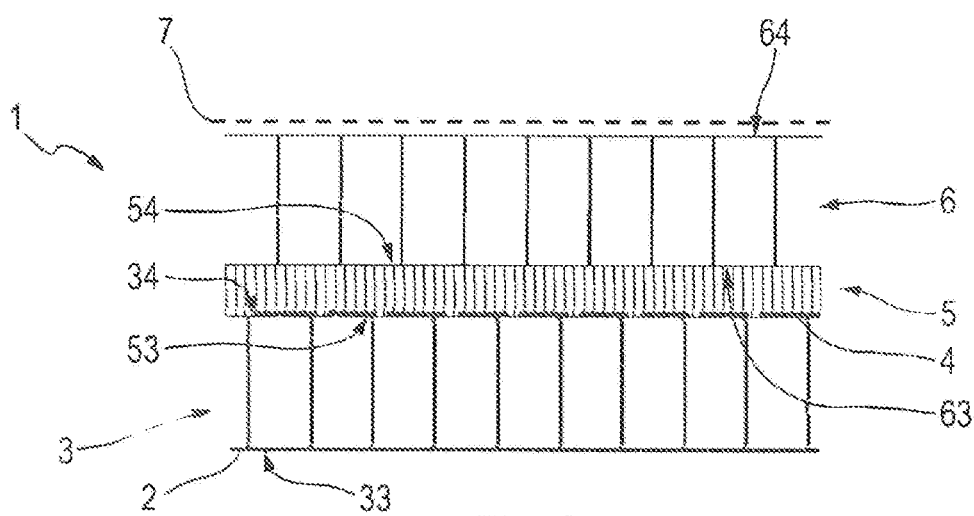
FIG. 2 shows a cross section of the acoustic panel that is identical to the cross section in FIG. 1.

The acoustic panel 1 for an aircraft AC is shown in cross section in FIG. 1 and FIG. 2.

As shown in FIG. 1 and FIG. 2, the acoustic panel 1 comprises at least the following, superposed in the following order: a solid rear skin 2, a cellular structure 3, an intermediate layer 4, a cellular structure 5, a cellular structure 6, and a resistive skin 7 comprising perforations 70. These elements are superposed and fastened together, for example using an adhesive layer.

In a non-limiting manner, the rear skin 2 can have a thickness of between 0.5 mm and 3 mm, preferably 1 mm. The resistive skin can have a thickness of between 0.5 mm and 2 mm, for example 0.55 mm.

The cellular structure 3 comprises a network of cells 30. Each of these cells 30 has a first characteristic section 31 and a longitudinal axis 32. The first characteristic section 31 corresponds to the surface area of the cross section of the cell 30, i.e., a section of the cell 30 perpendicular to the longitudinal axis 32.

The cellular structure 5 comprises a network of cells 50. Each of these cells 50 has a second characteristic section 51 and a longitudinal axis 52 substantially parallel to the longitudinal axis 32. The second characteristic section 51 is strictly smaller than the first characteristic section 31.

The cellular structure 6 comprises a network of cells 60. Each of the cells 60 has a third characteristic section 61 and a longitudinal axis 62 substantially parallel to the longitudinal axis 52.

The cellular structure 5 and the cellular structure 6 are fastened together by said adhesive layer applied to the ends of the walls forming the cells 50 of the cellular structure 5.

A cellular structure is a network of substantially identical tube-shaped cells 30, 50, 60 having longitudinal axes 32, 52, 62 that are substantially parallel to each other. Each of the cells 30, 50, 60 may have a range of shapes in cross section.

The cellular structures 3, 5 and 6 may be honeycomb structures. In this case, each of the cells 30, 50 and 60 is a tube with a substantially hexagonal characteristic section 31, 51 and 61. In a non-limiting manner, the cellular structures 3, 5 and 6 can be made of aluminum or of high-performance synthetic fibers such as poly(m-phenylene isophthalamide) (also known as "Nomex").

The intermediate layer 4 has perforations 40. Each of the perforations 40 is aligned with a cell 30 of the cellular structure 3. All of the cells 30 of the cellular structure 3 are therefore opened by a perforation 40. The perforations 40 in the intermediate layer 4 have a characteristic surface area strictly smaller than the first characteristic section 31. A characteristic surface area of the perforations 40 is an average area of all of the perforations 40 in the intermediate layer 4.

In a non-limiting manner, the perforations 40 can have a diameter in a range of 1 mm to 5 mm, for example 3 mm.

The acoustic panel 1 thus combines two sets of resonators.

Figure 5:
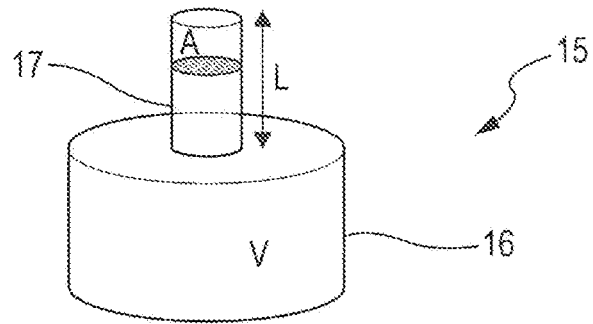
FIG. 5 is a perspective view of a Helmholtz resonator.

The cellular structure 3 and the cellular structure 5 form a set of Helmholtz resonators 15 with the intermediate layer 4. A Helmholtz resonator 15 is a resonant cavity 16 of volume V connected by a neck 17 of section A and length L (FIG. 5). The Helmholtz resonator 15 can absorb noise with a frequency of the order of the characteristic frequency of the resonator. This frequency has the expression $$f_0 = \frac{c}{2\pi}\sqrt{\frac{A}{VL}},$$

where c is the speed of sound. Since the second characteristic section 51 of the cells 50 of the cellular structure 5 is strictly smaller than the first characteristic section 31 of the cellular structure 3, several cells 50 of the cellular structure 5 are at least partially aligned with a cell 30 of the cellular structure 3. The perforations 40 in the intermediate plate 4 allow a single cell 50 or at least one cell 50 of the cellular structure 5 to communicate with a cell 30 of the cellular structure 3. The other cells 50 are closed if they are not aligned with a perforation 40. Each of the cells 30 of the cellular structure 3 thus forms a resonant cavity. Each of the cells 50 of the cellular structure 5 that communicates with a cell 30 of the cellular structure 3 forms a neck.

Figure 4:
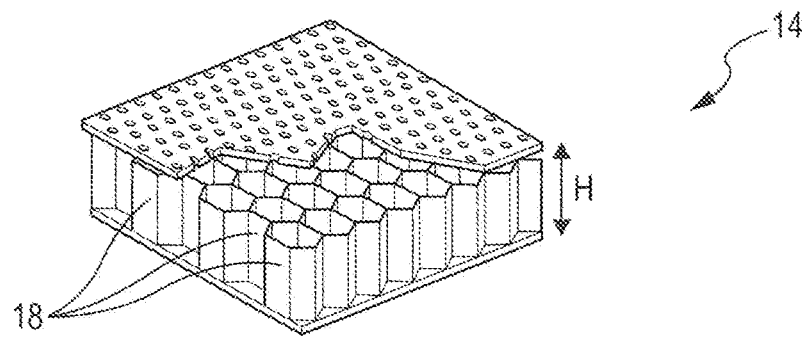
FIG. 4 is a perspective view of an acoustic panel comprising a plurality of quarter-wave resonators.

The cellular structure 6 forms a set 14 of quarter-wave resonators 18. A quarter-wave resonator 18 is a tube-shaped cavity with a longitudinal dimension H of the order of magnitude of the inverse of the frequency to be absorbed (FIG. 4).

The cells 50 of the cellular structure 5 that do not communicate with a cell 30 of the cellular structure 3 can nonetheless act as quarter-wave resonators with the cells 60 of the cellular structure 6 with which said cells communicate.

Figure 6:
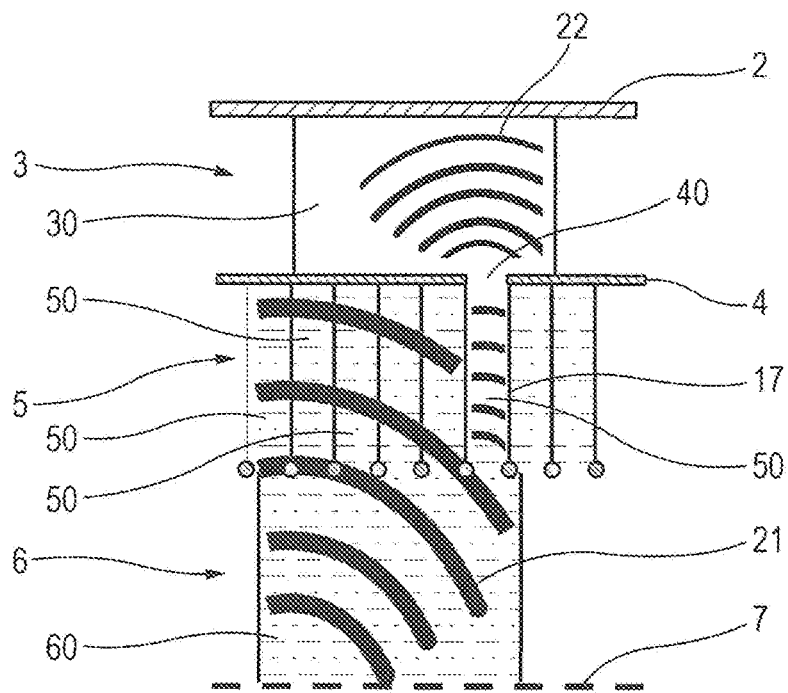
FIG. 6 shows a cross section of the acoustic panel in a cell of the first cellular structure and a cell of the third cellular structure, and the propagation of noise through the cellular structures.

As shown in FIG. 6, the noise to be attenuated enters the acoustic panel 1 through the resistive skin 7. The noise 21 is first attenuated by the quarter-wave resonator and then the noise 22 is attenuated by the Helmholtz resonator when passing through the neck 17 formed by a cell 50 of the cellular structure 5. Furthermore, the cells 50 that do not communicate with a cell 30 of the cellular structure 3 can also attenuate the noise 21 by acting as quarter-wave resonators.

In general, the Helmholtz resonator attenuates frequencies lower than the quarter-wave-resonator frequencies. The combination of the two resonators therefore enables a wide range of frequencies to be attenuated.

In a non-limiting manner, the first characteristic section 31 and the third characteristic section 61 may be designed so that the diameter of the surface of these characteristic sections 31, 61 is between 15 mm and 25 mm, for example 19 mm. In the case of cells with a hexagonal cross section, the diameter is equal to the distance between two opposite sides of the hexagon. For any polygonal shape, the diameter is equal to the greatest distance between two opposite sides. For all other shapes (for example an oval), the diameter is the greatest distance between two points on the circumference or periphery of the surface of the shape.

The thickness of the cellular structure 3 can be between 5 mm and 25 mm, for example 12 mm.

The thickness of the cellular structure 6 can be between 5 mm and 30 mm, for example 14 mm.

The second characteristic section 51 may be designed so that the diameter of the surface of this characteristic section 51 is substantially equal to 3.2 mm.

The thickness of the cellular structure 5 can be between 5 mm and 15 mm, for example 6 mm or 11 mm.

For example, the rear skin 2 has a thickness of 1 mm. The cellular structure 3 has a thickness of 12 mm and cells 30 with a diameter of 19.1 mm. Each of the cells 30 forms a cavity 16 of a Helmholtz resonator 15. The cellular structure 5 has a thickness of 11 mm and cells 50 with a diameter of 3.2 mm. Each of the cells 50 that communicates with a cell 30 forms a neck 17 of the Helmholtz resonator 15. The cellular structure 6 has a thickness of 25 mm and cells 60 with a diameter of 19.1 mm. Each of the cells 60 forms a quarter-wave resonator 18. The resistive skin 7 has a thickness of 0.552 mm. This example makes it possible to attenuate noises at frequencies in a range centered around 700 Hz.

Each of the perforations 40 of the intermediate layer 4 can be aligned with a cell 50 of the cellular structure 5.

However, the perforations 40 can also be aligned with several cells 50 of the cellular structure 5.

According to one embodiment, the intermediate layer 4 is a perforated plate fastened to the cellular structure 3 and to the cellular structure 5. In this embodiment, an adhesive layer fastens the intermediate layer 4 and the cellular structure 3 together, and another adhesive layer fastens the intermediate layer 4 and the cellular structure 5 together.

According to another embodiment, the intermediate layer 4 is a perforated adhesive layer. In this embodiment, the adhesive layer fastens the cellular structure 3 and the cellular structure 5 together.

Figure 7:
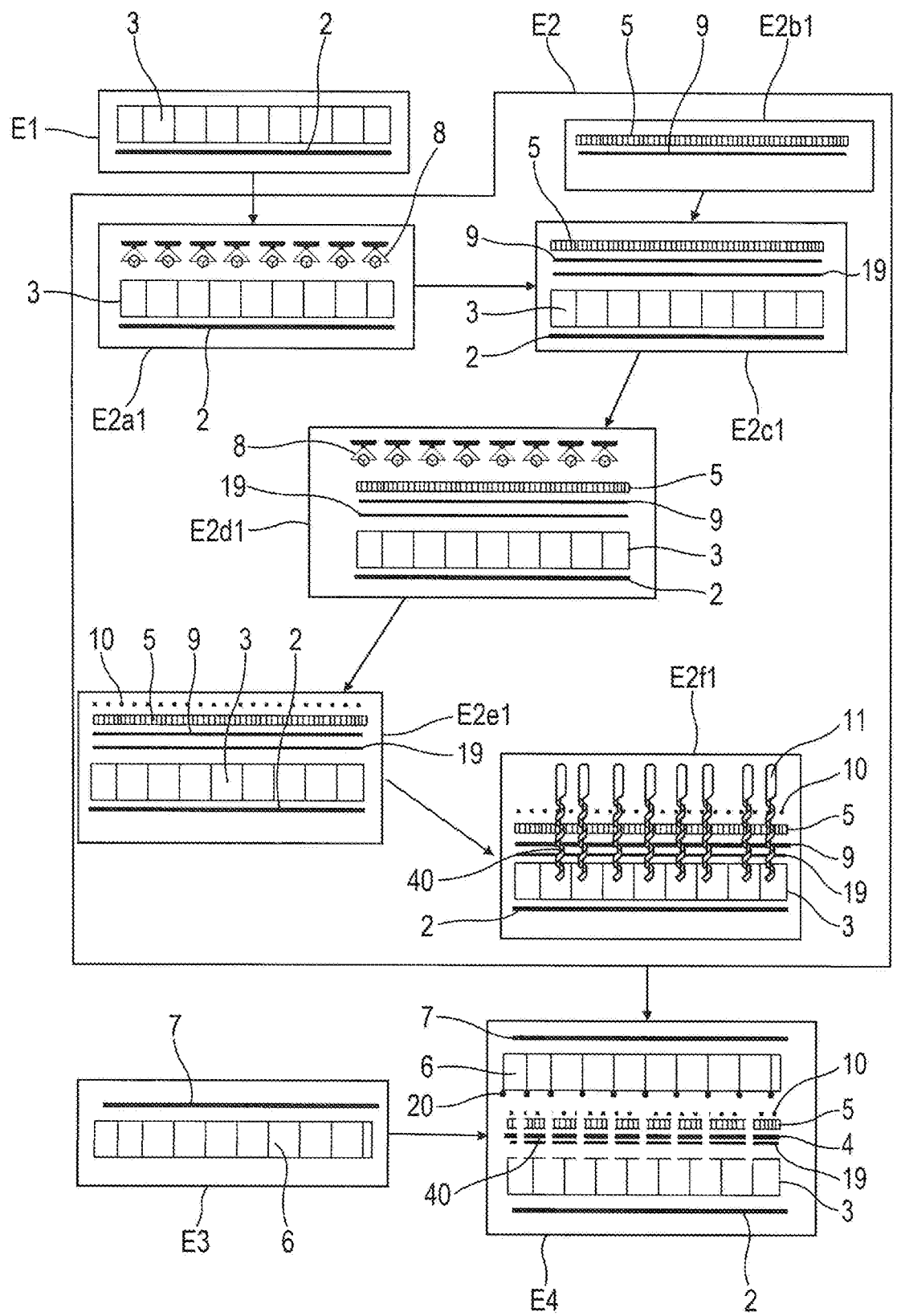
FIG. 7 schematically shows the manufacturing method for the acoustic panel according to a first embodiment.
Figure 8:
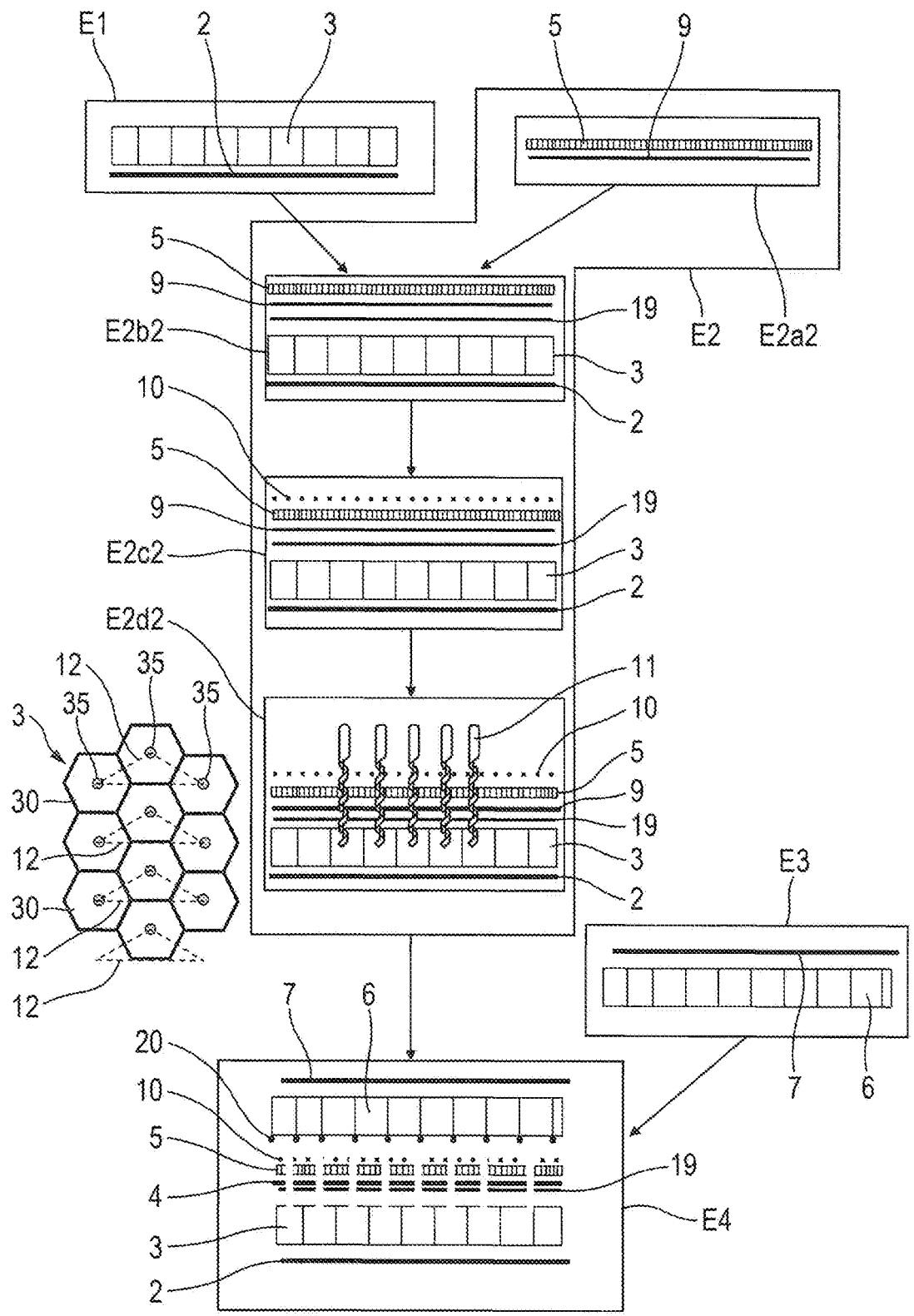
FIG. 8 schematically shows the manufacturing method for the acoustic panel according to a second embodiment.
Figure 9:
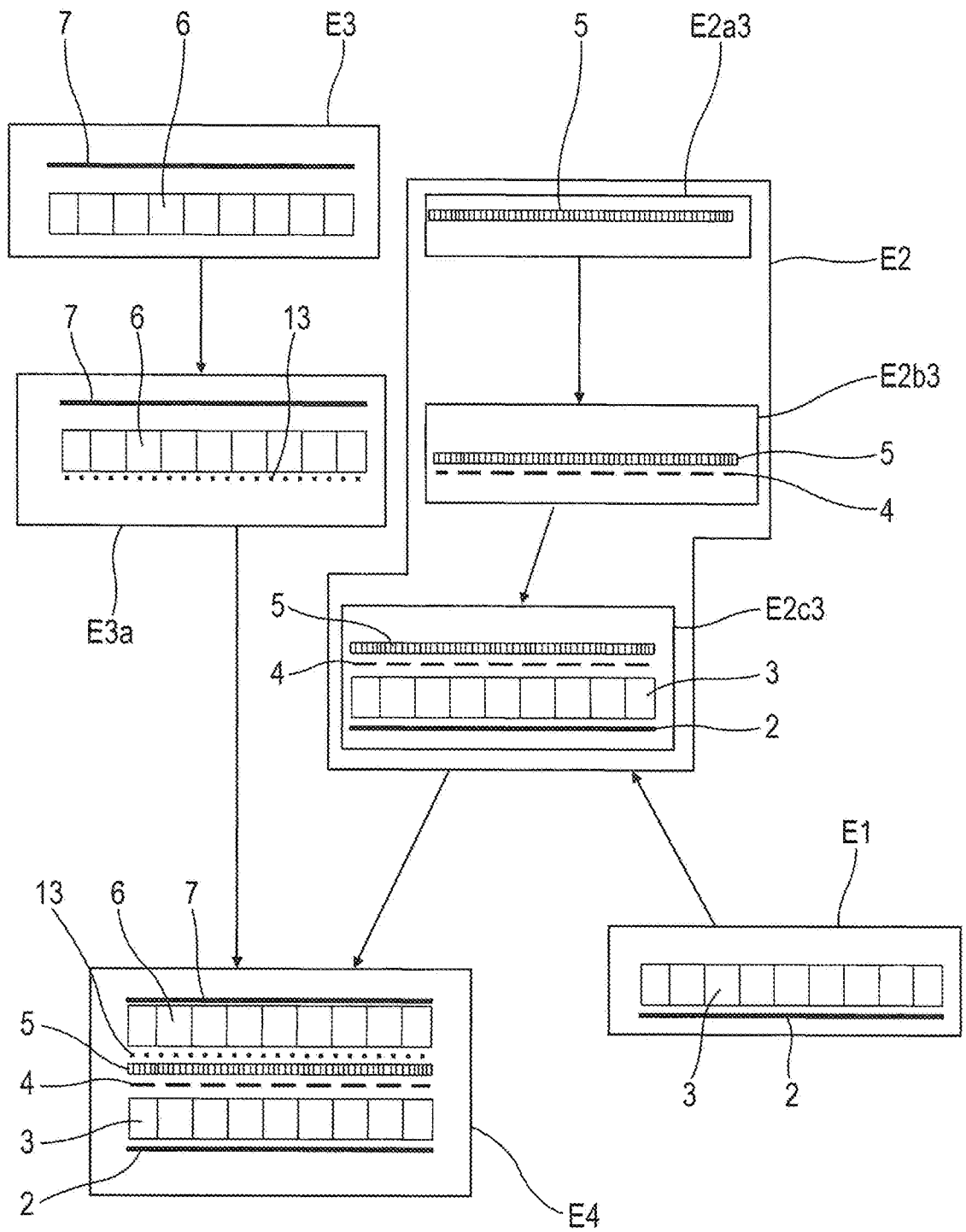
FIG. 9 schematically shows the manufacturing method for the acoustic panel according to a third embodiment.

The invention also relates to a method for manufacturing an acoustic panel of an aircraft AC (FIG. 7, FIG. 8 and FIG. 9).

Figure 10:
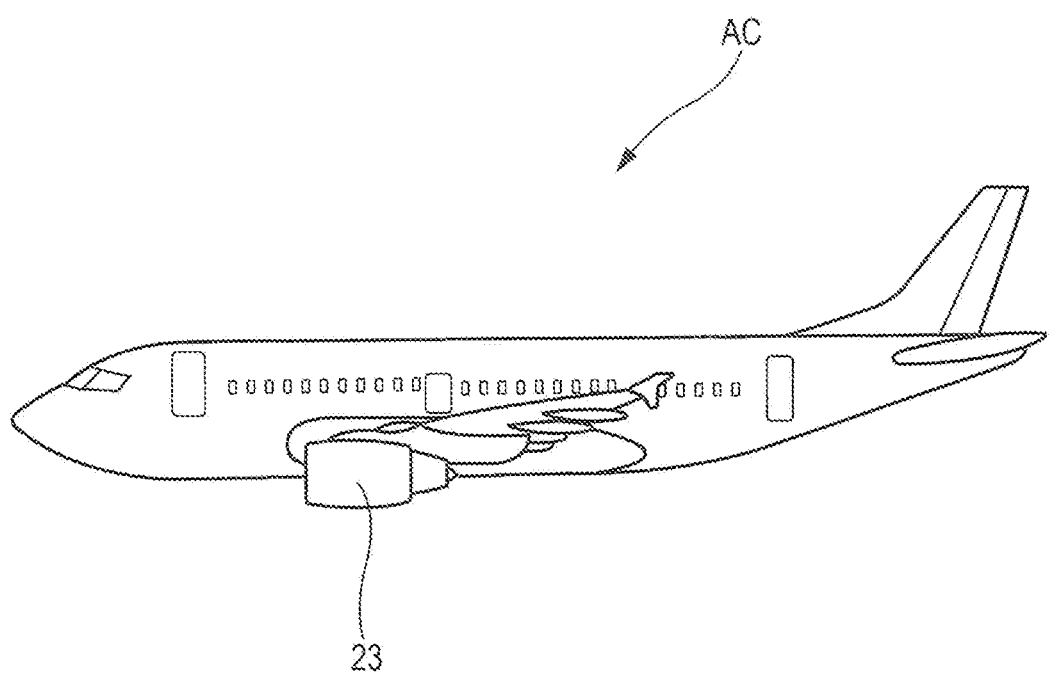
FIG. 10 is a side view of an aircraft equipped with a propulsion unit comprising an acoustic panel according to the present invention.

The manufacturing method includes a forming and fastening step E1. This step E1 comprises forming the rear skin 2 and the cellular structure 3 in a mold. The mold allows the rear skin 2 and the cellular structure 3 to be formed so that the acoustic panel 1 is the desired shape, such as the shape of a leading edge of a nacelle of a propulsion unit 23 of the aircraft AC (FIG. 10). This step E1 also comprises fastening the rear skin 2 to a first face 33 of the cellular structure 3. Forming and fastening can be done simultaneously in the forming mold. An adhesive layer is then applied between the rear skin 2 and the cellular structure 3.

The method further comprises an assembly step E2. This step E2 comprises assembling the intermediate layer 4 on a second face 34 of the cellular structure 3 and on a first face 53 of the cellular structure 5. The second face 34 of the cellular structure 3 is opposite the first face 33 of the cellular structure 3 (FIG. 2). Each of the cells 50 has a first end opening into the first face 33 and a second end opening into the second face 34.

The method further includes a forming and fastening step E3. This step E3 comprises forming the resistive skin 7 and the cellular structure 6 in the mold. As in step E1, the mold is used to form the resistive skin 7 and the cellular structure 6 so that the acoustic panel 1 is the desired shape. This step E3 also includes fastening the resistive skin 7 to a first face 64 of the cellular structure 6.

The method also includes a fastening step E4. This step E4 comprises fastening a second face 54 of the cellular structure 5 to a second face 63 of the cellular structure 6. The second face 54 of the cellular structure 5 is opposite the first face 53 of the cellular structure 5. Each of the cells 50 has a first end opening into the first face 64 and a second end opening into the second face 63. The second face 63 of the cellular structure 6 is opposite the first face 64 of the cellular structure 6 (FIG. 2). Each of the cells 60 has a first end opening into the first surface 33 and a second end opening into the second surface 34. Forming and fastening can be done simultaneously in the forming mold. An adhesive layer is then applied between the resistive skin 7 and the cellular structure 6.

Figure 3A:
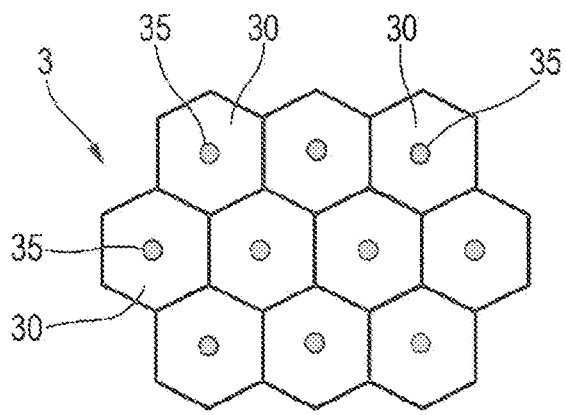
FIG. 3A is a top view of the first cellular structure and the centers of the cells of the first cellular structure.

According to a first embodiment shown in FIG. 7, the assembly step E2 comprises an identification sub-step E2a1 that comprises using an identification device 8 to determine the positions of the centers 35 of the cells 30 of the cellular structure 3. For example, the identification device 8 may include a camera, a computer that determines the position of the centers 35 of the cells 30 using the images captured by the camera (FIG. 3A), and a memory for storing the positions of the centers 35 determined by the computer. The camera is intended to capture images of the cellular structure 3 in a direction parallel to the longitudinal axis 32 of each of the cells 30.

In this first embodiment, the assembly step E2 further comprises a forming and fastening sub-step E2b1. This step E2b1 comprises forming a solid layer 9 and the cellular structure 5 in the mold. As in step E1, the mold is used to form the solid layer 9 and the cellular structure 5 so that the acoustic panel 1 is the desired shape. The step E2b1 also comprises fastening the solid layer 9 to the first face 53 of the cellular structure 5. Forming and fastening can be done simultaneously in the forming mold. An adhesive layer is then applied between the solid layer 9 and the cellular structure 5.

The assembly step E2 also includes a sub-step E2c1 of fastening the solid layer 9 to the second face 34 of the cellular structure 3 to which the rear skin 2 is fastened in the forming and fastening step E1. This sub-step E2c1 can be performed by applying an adhesive layer 19 between the solid layer 9 and the cellular structure 3.

Figure 3B:
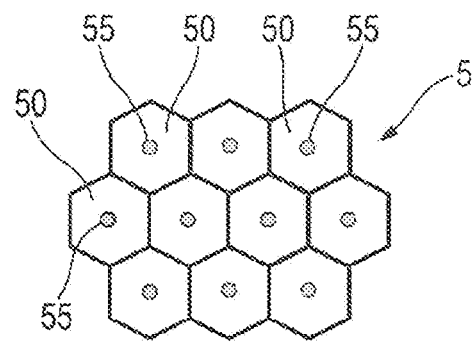
FIG. 3B is a top view of the second cellular structure and the centers of the cells of the second cellular structure.

The assembly step E2 also includes an identification sub-step E2d1 that comprises using the identification device 8 to determine the positions of the centers 55 of the cells 50 of the cellular structure 5 (FIG. 3B). For example, the camera of the identification device 8 captures images of the cellular structure 5 in a direction parallel to the longitudinal axis 52 of each of the cells 50. The computer then determines the positions of the centers 55 of the cells 50 using the images captured by the camera. The memory then stores the positions of the centers 55 determined by the computer.

The assembly step E2 also includes a sub-step E2e1 of applying an adhesive layer 10 to the second face 54 of the cellular structure 5. The adhesive layer 10 is perforated at each of the cells 50 of the cellular structure 5. This means that the adhesive layer 10 is applied to the ends of the walls forming the cells 50 on the second face 54 of the cellular structure 5.

The assembly step E2 further comprises a sub-step E2f1 of perforating the solid layer 9 with a perforation device 11 to obtain the intermediate layer 4. The perforation sub-step E2f1 comprises a plurality of perforations 40 of the solid layer at positions corresponding to the positions determined during the identification sub-step E2d1 that are closest to the positions determined during the identification sub-step E2a1.

In this first embodiment, the fastening step E4 comprises fastening the second face 54 of the cellular structure 5 to the second face 63 of the cellular structure 6 using the adhesive layer 10 applied during the application sub-step E2e1. An adhesive layer 20 may also be applied to the second face 63 of the cellular structure 6. This adhesive layer 20 is applied to the ends of the walls forming the cells 60 on the second face 63 of the cellular structure 6. According to a second embodiment shown in FIG. 8, the assembly step E2 comprises a forming and fastening sub-step E2a2.

This step E2a2 comprises forming a solid layer 9 and the cellular structure 5 in the mold. As in step E1, the mold is used to form the solid layer 9 and the cellular structure 5 so that the acoustic panel 1 is the desired shape. This step E2a2 also comprises fastening the solid layer 9 to the first face 53 of the cellular structure 5. Forming and fastening can be done simultaneously in the forming mold. An adhesive layer is then applied between the solid layer 9 and the cellular structure 5.

The assembly step E2 also includes a sub-step E2b2 of fastening the solid layer 9 to the second face 34 of the cellular structure 3 to which the rear skin 2 is fastened in the forming and fastening step E1. This sub-step E2b2 can be performed by applying an adhesive layer 19 between the solid layer 9 and the cellular structure 3.

The assembly step E2 also comprises a sub-step E2c2 of applying an adhesive layer 10 to the second face 54 of the cellular structure 5. The adhesive layer 10 is perforated at each of the cells 50 of the cellular structure 5. This means that the adhesive layer 10 is applied to the ends of the walls forming the cells 50 on the second face 54 of the cellular structure 5.

The assembly step E2 further comprises a sub-step E2d2 of perforating the solid layer 9 with a perforation device 11 to obtain the intermediate layer 4. The perforation sub-step E2d2 includes a plurality of perforations 40 of the solid layer at positions corresponding to a predetermined regularly repeating positional pattern 12. The positional pattern 12 is predetermined as a function of the network of cells 30 of the cellular structure 3. The positional pattern 12 is a representative positional pattern of the centers 35 of the cells 30 of the cellular structure 3. FIG. 8 shows an example of a positional pattern 12. In this example, the positional pattern 12 comprises three positions of centers 35 arranged in a triangle. This positional pattern 12 is repeated regularly several times over the entire surface of the cellular structure 3.

The cellular structure 5 may have cells 50 that do not all have exactly the same geometry. Consequently, the perforations made during the perforation sub-step E2d2 may cause the perforations 40 of the intermediate layer 4 to align with multiple cells 50 (two or three cells 50) of the cellular structure 5, since the centers 55 of the cellular structure 5 are not identified or marked, as is the case in the first embodiment of the method. This results in a noise attenuation amplitude for a noise frequency that is smaller (for example 700 Hz), but the noise frequency range attenuated is larger (for example from 1400 Hz to 2100 Hz). This can be considered an advantage.

In this second embodiment, the fastening step E4 comprises fastening the second face 54 of the cellular structure 5 to the second face 63 of the cellular structure 6 using the adhesive layer 10 applied during the application sub-step E2c2. An adhesive layer 20 may also be applied to the second face 63 of the cellular structure 6. This adhesive layer 20 is applied to the end of the walls forming the cells 60 on the second face 63 of the cellular structure 6.

According to a third embodiment of the method, the assembly step E2 comprises a forming sub-step E2a3 that comprises forming the cellular structure 5 in the mold. As in step E1, the mold is used to form the cellular structure 5 so that the acoustic panel 1 is the desired shape.

The assembly step E2 also includes a sub-step E2b3 of applying an adhesive layer to form the intermediate layer 4. The application sub-step E2b3 comprises applying the adhesive layer to the first face 53 of the cellular structure 5. The adhesive layer is perforated at positions corresponding to a predetermined repeating positional pattern. The positional pattern is predetermined as a function of the network of cells 30 of the cellular structure 3. As in the second embodiment, the positional pattern is a representative positional pattern of the centers 35 of the cells 30 of the cellular structure 3. This positional pattern is repeated regularly several times over the entire surface of the cellular structure 3.

The assembly step E2 also comprises a sub-step E2c3 of fastening the cellular structure 5 to the cellular structure 3 using the intermediate layer 4, which is an adhesive layer applied during the application sub-step E2b3.

Furthermore, the method according to the third embodiment of the assembly step E2 can also include a sub-step E3a of applying an adhesive layer 13 to the second face 63 of the cellular structure 6. The adhesive layer 13 is perforated at each cell 50 of the cellular structure 5 so that this adhesive layer 13 is applied to the ends of the walls forming the cells 50 on the second face 54 of the cellular structure 5. In this embodiment, the application step E3a precedes the fastening step E4. The fastening step E4 comprises fastening the second face 54 of the cellular structure 5 to the second face 63 of the cellular structure 6 using the adhesive layer 13 applied during the application step E3a.

The acoustic panel 1 may be fitted to the leading edge of a nacelle of a propulsion unit 23 of an aircraft AC (FIG. 10).

This acoustic panel 1 no longer requires tubes to be inserted. This acoustic panel has a lower mass than an acoustic panel requiring the insertion of tubes. This acoustic panel also retains statistically high acoustic performance and enables the frequency range of attenuated noise to be increased. This acoustic panel is also inexpensive to manufacture.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic panel for an aircraft, comprising the following superposed elements arranged in a given order and fastened together:
   a solid rear skin,
   a first cellular structure comprising a network of cells, each cell of the network of cells having a first characteristic section and a first longitudinal axis,
   an intermediate layer comprising first perforations, each of the first perforations being aligned with a cell of the first cellular structure, the first perforations of the intermediate layer having a characteristic surface area that is strictly smaller than the first characteristic section,
   a second cellular structure comprising a network of cells, each cell in the network of cells having a second characteristic section and a second longitudinal axis parallel to the first longitudinal axis, the second characteristic section being strictly smaller than the first characteristic section, wherein each of the cells of the second cellular structure is aligned with at most one of the first perforations of the intermediate layer, such that each of the cells of the second cellular structure which is not aligned with one of the first perforations is closed,
   a third cellular structure comprising a network of cells, each cell of the network of cells having a third characteristic section and a third longitudinal axis parallel to the second longitudinal axis, and
   a resistive skin comprising second perforations.

2. The panel as claimed in claim 1, wherein the intermediate layer is a perforated plate fastened to the first cellular structure and to the second cellular structure.

3. The panel as claimed in claim 1, wherein the intermediate layer is a perforated adhesive layer.

4. The panel as claimed in claim 1, wherein the second perforations are disposed at positions corresponding to a predetermined regularly repeating positional pattern.

5. The panel as claimed in claim 4, wherein the predetermined regularly repeating positional pattern is a representative positional pattern of centers the cells in the first cellular structure.

6. The panel as claimed in claim 5, wherein the positional pattern comprises three positions of the centers of the cells in the first cellular structure which are arranged in a triangle.

7. The panel as claimed in claim 1, wherein the second perforations are smaller than the first perforations.

8. The panel as claimed in claim 1, wherein the characteristic surface area of the first perforations is approximately equal to, or is greater than, the second characteristic section.

9. A manufacturing method for an acoustic panel of an aircraft as claimed in claim 1, comprising the following steps:
   forming, in a first forming and fastening step, the rear skin and the first cellular structure in a mold and fastening the rear skin to a first face of the first cellular structure,
   assembling, in an assembly step, the intermediate layer on a second face of the first cellular structure and on a first face of the second cellular structure, the second face of the first cellular structure being opposite the first face of the first cellular structure,
   forming, in a second forming and fastening step, the resistive skin and the third cellular structure in the mold and fastening the resistive skin to a first face of the third cellular structure,
   fastening, in a third fastening step, a second face of the second cellular structure to a second face of the third cellular structure, the second face of the second cellular structure being opposite the first face of the second cellular structure, the second face of the third cellular structure being opposite the first face of the third cellular structure.

10. The method as claimed in claim 9, wherein the assembly step comprises the following sub-steps:
   identifying, in a first identification sub-step, by using an identification device to determine positions of centers of the cells of the first cellular structure,
   forming, in a first forming and fastening sub-step, a solid layer and the second cellular structure in the mold and fastening the solid layer to the first face of the second cellular structure,
   fastening, in a fastening sub-step, of the solid layer to the second face of the first cellular structure to which the rear skin is fastened during the forming and fastening step,
   identifying, in a second identification sub-step, by using the identification device to determine the positions of the centers of the cells of the second cellular structure,
   applying, in an application sub-step, an adhesive layer to the second face of the second cellular structure, the adhesive layer being perforated at each of the cells of the second cellular structure,
   perforating, in a perforation sub-step, by using a perforation device to perforate the solid layer to obtain the intermediate layer, the perforation sub-step comprising a plurality of first perforations of the solid layer at positions corresponding to positions determined during the second identification sub-step closest to the positions determined during the first identification sub-step,
   wherein the third fastening step comprises fastening the second face of the second cellular structure to the second face of the third cellular structure using the adhesive layer applied during the application sub-step.

11. The method as claimed in claim 9, wherein the assembly step comprises the following sub-steps:
   forming, in a first forming and fastening sub-step, a solid layer and the second cellular structure in the mold and fastening the solid layer to the first face of the second cellular structure,
   fastening, in a fastening sub-step, the solid layer to the second face of the first cellular structure to which the rear skin is fastened during the forming and fastening step,
   applying, in an application sub-step, an adhesive layer to the second face of the second cellular structure, the adhesive layer being perforated at each of the cells of the second cellular structure,
   perforating, in a perforation sub-step, using a perforation device to perforate the solid layer to obtain the intermediate layer, the perforation sub-step comprising a plurality of first perforations of the solid layer at positions corresponding to a predetermined regularly repeating positional pattern, the positional pattern being predetermined as a function of the network of cells of the first cellular structure,
   wherein the third fastening step comprises fastening the second face of the second cellular structure to the second face of the third cellular structure using the adhesive layer applied during the application sub-step.

12. The method as claimed in claim 9, wherein the assembly step comprises the following sub-steps:
   forming, in a first forming sub-step, the second cellular structure in the mold,
   applying, in a first application sub-step, an adhesive layer to form the intermediate layer, the first application sub-step comprising the application of the adhesive layer to the first face of the second cellular structure, the adhesive layer being perforated at positions corresponding to a predetermined repeating positional pattern, the positional pattern being predetermined as a function of the network of cells of the first cellular structure,
   fastening, in a fastening sub-step, the second cellular structure to the first cellular structure using the adhesive layer applied during the first application sub-step.

13. The method as claimed in claim 9, further comprising
   applying, in an application step, an adhesive layer to the second face of the third cellular structure, the adhesive layer being perforated at each cell of the second cellular structure, the application step preceding the third fastening step,
   fastening, in the third fastening step, of the second face of the second cellular structure to the second face of the third cellular structure using the adhesive layer applied during the application step.

14. A propulsion unit for an aircraft comprising at least one acoustic panel as claimed in claim 1.

15. An aircraft comprising at least one acoustic panel as claimed in claim 1.

* * * * *